(12) United States Patent
Okuzu et al.

(10) Patent No.: US 9,518,195 B2
(45) Date of Patent: Dec. 13, 2016

(54) BIAXIALLY STRETCHED POLYESTER FILM AND METHOD FOR PRODUCING SAME

(75) Inventors: Takayoshi Okuzu, Kyoto (JP); Tomoharu Suzuki, Kyoto (JP)

(73) Assignee: UNITIKA LTD., Hyogo (JP)

( * ) Notice: Subject to any disclaimer, the term of this patent is extended or adjusted under 35 U.S.C. 154(b) by 243 days.

(21) Appl. No.: 14/241,525

(22) PCT Filed: Sep. 3, 2012

(86) PCT No.: PCT/JP2012/072299
§ 371 (c)(1),
(2), (4) Date: Feb. 27, 2014

(87) PCT Pub. No.: WO2013/035653
PCT Pub. Date: Mar. 14, 2013

(65) Prior Publication Data
US 2014/0193648 A1 Jul. 10, 2014

(30) Foreign Application Priority Data

Sep. 6, 2011 (JP) ................................ 2011-193431

(51) Int. Cl.
*B29C 51/04* (2006.01)
*B29C 55/12* (2006.01)
(Continued)

(52) U.S. Cl.
CPC ......... *C09D 167/02* (2013.01); *B29C 47/0057* (2013.01); *B29C 55/12* (2013.01); *C08J 5/18* (2013.01); *B29C 51/04* (2013.01); *B29K 2067/003* (2013.01); *B29K 2067/006* (2013.01); *B29K 2105/0088* (2013.01); *C08G 63/183* (2013.01); *C08J 2367/02* (2013.01);
(Continued)

(58) Field of Classification Search
None
See application file for complete search history.

(56) References Cited

U.S. PATENT DOCUMENTS 6,156,441 A * 12/2000 Hamada ................... B29D 7/01
206/524.1
2011/0081512 A1 4/2011 Noda et al.

FOREIGN PATENT DOCUMENTS

| CN | 102036819 | 4/2011 |
|----|-----------|--------|
| JP | 10-168293 | 6/1998 |

(Continued)

OTHER PUBLICATIONS

Machine translation of JP 10-168293.
(Continued)

*Primary Examiner* — Ramsey Zacharia
(74) *Attorney, Agent, or Firm* — Fildes & Outland, P.C.

(57) ABSTRACT

A biaxially stretched polyester film, being a biaxially stretched film including a modified polybutylene terephthalate (modified PBT) and polyethylene terephthalate (PET), wherein a mass ratio (modified PBT/PET) between the modified PBT and PET is 20/80 to 5/95, the modified PBT is a PBT containing 5 to 20% by mass of a polytetramethylene glycol unit having a molecular weight of 600 to 4,000, the amount of tetrahydrofuran (THF) generated by heat treating the biaxially stretched film in a helium gas atmosphere at 180° C. for 30 minutes is 50 μg/g or less, and the biaxially stretched film has tear linearity in a lengthwise direction thereof.

3 Claims, 1 Drawing Sheet

AA Incision

(51) Int. Cl.
*C08J 5/18* (2006.01)
*C08G 63/183* (2006.01)
*C09D 167/02* (2006.01)
*B29C 47/00* (2006.01)
*B29K 67/00* (2006.01)
*B29K 105/00* (2006.01)

(52) U.S. Cl.
CPC .................. *Y10T 428/31681* (2015.04); *Y10T 428/31786* (2015.04)

(56) References Cited

FOREIGN PATENT DOCUMENTS

| | | |
|---|---|---|
| JP | 11-163115 | 6/1999 |
| JP | 11-227135 | 8/1999 |
| JP | 11-300916 | 11/1999 |
| JP | 11-302405 | 11/1999 |
| JP | 2000-318035 | 11/2000 |
| JP | 2001-162752 | 6/2001 |
| JP | 2001-247688 | 9/2001 |
| JP | 2002-003707 | 1/2002 |
| JP | 2002-020597 | 1/2002 |
| JP | 2002-178401 | 6/2002 |
| JP | 2006-150617 | 6/2006 |
| JP | 2007-203567 | 8/2007 |

OTHER PUBLICATIONS

Machine translation of JP 11-227135.
Machine translation of JP 11-300916.
Machine translation of JP 11-302405.
Machine translation of JP 2000-318035.
Machine translation of JP 2002-020597.
Machine translation of JP 2001-162752.
Machine translation of JP 2006-150617.
Machine translation of JP 11-163115.
Machine translation of JP 2002-178401.
Machine translation of JP 2001-247688.
Machine translation of JP 2002-003707.
Machine translation of JP 2007-203567.
Communication pursuant to Article 94(3) EPC, in corresponding European Patent Application No. 12 829 275.2, dated Aug. 31, 2016.
Richard M. Lum; "Thermal Decomposition of Poly(butylene Terephthalate)"; Journal of Polymer Science: Polymer Chemistry Edition; vol. 17, No. 1, pp. 203-213, 1979.
English language translation of Taiwanese Office Action in Taiwan Patent Application No. 101132283 dated Feb. 18, 2016.

* cited by examiner

AA Incision (a)     (b)

BIAXIALLY STRETCHED POLYESTER FILM AND METHOD FOR PRODUCING SAME

TECHNICAL FIELD

The present invention relates to a polyester film having tear linearity, suitable as a film used, for example, for packaging materials, electrical insulating materials and general industrial materials.

BACKGROUND ART

For packaging food, medical and pharmaceutical products and miscellaneous goods, packaging bags using various plastic films are frequently used; packaging bags prepared by laminating heat-sealable non-oriented plastic in two or three layers on biaxially stretched plastic films are widely used.

Among plastic films, biaxially stretched polyester films are excellent in durability, moisture proofness, mechanical strength, heat resistance and oil resistance, are produced by the methods such as a tubular method, a flat-type simultaneous biaxial stretching method and a flat-type successive biaxial stretching method, and are widely used in the fields such as the field of food packaging.

However, packaging bags using biaxially stretched polyester films are unfortunately poor in tear openability. There is a method for imparting a notch in order to improve the openability; however, tearing from a notch frequently results in a phenomenon such that no linear tearing occurs, and consequently, the contents in the packaging bags are scattered to be wastes; additionally, soft confectionaries such as cookies are cracked at the time of opening packages, and when the contents are liquids, troubles such as staining of clothes may occur at the time of opening packages.

As easily openable materials excellent in the tear linearity such that when a film is torn, the film is torn linearly, there are materials prepared by laminating with a uniaxially stretched polyolefin film serving as an intermediate layer. Examples of such materials include a three-layer laminate film of biaxially stretched polyester film/uniaxially stretched polyolefin film/nonstretched polyolefin film; however, this three layer laminate film requires to be purposely provided with an intermediate layer, thus has a problem involving cost, and has been limited in the use thereof.

Accordingly, the present applicant has previously discovered, as a method for imparting the tear linearity to a biaxially stretched polyester film itself, a method in which a polybutylene terephthalate (modified PBT) including a polytetramethylene glycol (PTMG) having a molecular weight of 600 to 4000 in a proportion of 5 to 20% is mixed with polyethylene terephthalate (PET), in a ratio of modified PBT/PET=30/70 to 5/95 (Patent Literature 1 to Patent Literature 6).

Additionally, the present applicant has proposed a biaxially stretched polyester film and a laminate having tear linearity while having a high level of barrier property against oxygen or water vapor, on the basis of the vapor deposition of a metal compound such as aluminum oxide or silicon oxide at least on one side of a biaxially stretched polyester film having tear linearity (Patent Literature 7 and Patent Literature 8).

However, the biaxially stretched polyester film imparted with tear linearity is larger in the amounts of the outgases remaining in the film as compared to usual polyester films. Accordingly, this film is not able to be used as the film constituting the containers or packages for housing electronic materials such as semiconductors, required to have high cleanliness. Additionally, this film unfortunately involves a drawback such that the vapor deposition processing of this film in a vacuum atmosphere tends to cause the instability of the quality of the vapor deposited layer with the increase of the roll length.

CITATION LIST

Patent Literature

Patent Literature 1: JP10-168293A
Patent Literature 2: JP11-227135A
Patent Literature 3: JP11-300916A
Patent Literature 4: JP11-302405A
Patent Literature 5: JP2000-318035A
Patent Literature 6: JP2002-20597A
Patent Literature 7: JP2001-162752A
Patent Literature 8: JP2006-150617A

SUMMARY OF INVENTION

Technical Problem

The technical problem of the present invention is to provide a biaxially stretched polyester film having tear linearity and being reduced in the amounts of the residual outgases in the film.

Solution to Problem

For the purpose of solving such a technical problem as described above, the present inventors made a diligent study, and have revealed that the outgases generated from a polyester film having tear linearity contain, in particular, tetrahydrofuran (THF) in a larger amount as compared to the outgases generated from a general PET film, and THF is generated from PBT (modified PBT) containing polytetramethylene glycol (PTMG). The present inventors focused attention on the amount of THF remaining in the modified PBT, and have reached the present invention by discovering that by mixing the modified PBT with PET resin after such THF is drastically removed in the stage of the modified PBT being in a form of chip, and by subsequently forming a film from the resulting mixture, a biaxially stretched polyester film is obtained in which the polyester has a function of tear linearity and the amounts of the residual outgases are small.

Specifically, the gist of the present invention is as follows.

(1) A biaxially stretched polyester film, being a biaxially stretched film including a modified polybutylene terephthalate (modified PBT) and polyethylene terephthalate (PET), wherein the mass ratio (modified PBT/PET) between the modified PBT and PET is 20/80 to 5/95, the modified PBT is a PBT containing 5 to 20% by mass of a polytetramethylene glycol unit having a molecular weight of 600 to 4,000, the amount of tetrahydrofuran (THF) generated by heat treating the biaxially stretched film in a helium gas atmosphere at 180° C. for 30 minutes is 50 μg/g or less, and the biaxially stretched film has tear linearity in the lengthwise direction thereof.

(2) A biaxially stretched polyester film, wherein at least on one side of the biaxially stretched polyester film according to (1), at least one of aluminum, aluminum oxide and silicon oxide is vapor deposited, and the biaxially stretched polyester film has a gas barrier property and tear linearity.

(3) A method for producing the biaxially stretched polyester film according to (1), wherein a modified polybutylene terephthalate (modified PBT) including 5 to 20% by mass of a polytetramethylene glycol unit having a molecular weight of 600 to 4,000 and giving an amount of tetrahydrofuran (THF), generated by heat treating in a helium gas atmosphere at 180° C. for 30 minutes, of 800 µg/g or less and polyethylene terephthalate (PET) are mixed so as for the mass ratio (modified PBT/PET) between the modified PBT and PET to be 20/80 to 5/95, a film is formed from the resulting mixture and the formed film is stretched.

Advantageous Effects of Invention

According to the present invention, a biaxially stretched polyester film is provided which has durability, moisture proofness, mechanical properties, heat resistance and oil resistance, and additionally has tear linearity in the lengthwise direction and is small in the amounts of the residual outgases. The film of the present invention is small in the amounts of the generated outgases, and accordingly suitable particularly for packaging bags in the fields requiring cleanliness, and allows a vapor-deposited layer to be stably formed even when the film is placed in a vacuum state.

DESCRIPTION OF EMBODIMENTS

Figure 1:
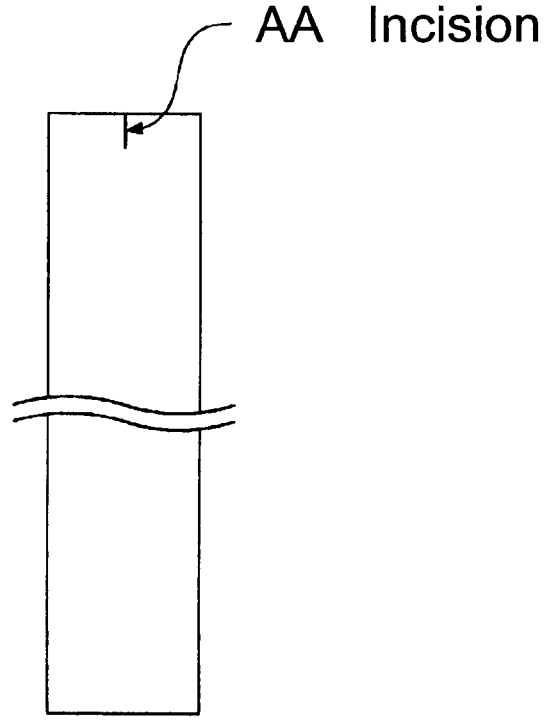
FIG. 1 is a diagram illustrating the shape of a specimen used for the tear linearity evaluation of a film.
Figure 2:
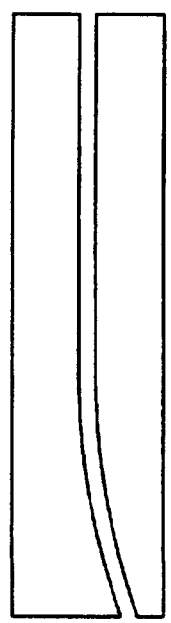
FIG. 2 is diagrams illustrating the shapes of the specimens after tearing in a tear test; (a) illustrates an example of a specimen after tearing of a sample satisfactory in tear linearity, and (b) illustrates an example of a specimen after tearing of a sample unsatisfactory in tear linearity.
Figure 2:
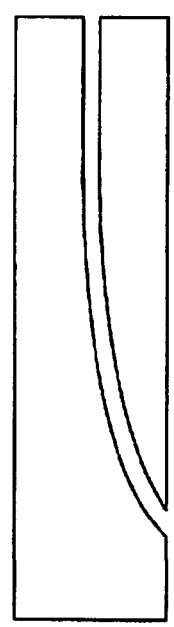

The biaxially stretched polyester film of the present invention includes a modified polybutylene terephthalate (modified PBT) and polyethylene terephthalate (PET).

In the present invention, PET includes terephthalic acid and ethylene glycol as the polymerization components thereof, and other components may also be copolymerized with these components within a range not impairing the advantageous effects of the present invention.

Examples of other copolymerization components include: dicarboxylic acids such as isophthalic acid, phthalic acid, 2,6-naphthalenedicarboxylic acid, 5-sodium sulfoisophthalic acid, succinic acid, adipic acid, sebacic acid, dodecanedioic acid, dimeric acid, maleic anhydride, maleic acid, fumaric acid, itaconic acid, citraconic acid, mesaconic acid and cyclohexanedicarboxylic acid; oxycarboxylic acids such as 4-hydroxybenzoic acid, ε-caprolactone and lactic acid; glycols such as 1,3-propanediol, 1,6-hexanediol and cyclohexanedimethanol; and multifunctional compounds such as trimellitic acid, trimesic acid, pyromellitic acid, trimethylolpropane, glycerin and pentaerythritol.

PET can be obtained by heretofore known method as follows: after an oligomer is obtained by the transesterification reaction between dimethyl terephthalate and ethylene glycol, or by a direct esterification method between terephthalic acid and ethylene glycol, PET is obtained by melt polymerization of the oligomer, or by further performing the solid phase polymerization of the product of the melt polymerization.

In the present invention, the modified polybutylene terephthalate (modified PBT) is a polybutylene terephthalate (PBT) including 5 to 20% by mass of a polytetramethylene glycol (PTMG) unit having a molecular weight of 600 to 4,000.

In the present invention, the molecular weight of PTMG constituting the modified PBT is required to be 600 to 4,000, and is preferably 1,000 to 3,000 and more preferably 1,000 to 2,000. When the molecular weight of PTMG is less than 600, the tear linearity of the obtained film is not achieved, and when the molecular weight of PTMG exceeds 4,000, the performances such as mechanical strength, dimensional stability and haze of the obtained film are degraded, and additionally, no stable tear linearity is developed.

The content of the PTMG unit in the modified PBT is required to be 5 to 20% by mass, and is preferably 10 to 20% by mass and more preferably 10 to 15% by mass. When the content of PTMG is less than 5% by mass, no tear linearity of the obtained film is developed, and when the content of PTMG exceeds 20% by mass, the performances such as mechanical strength, dimensional stability and haze of the obtained film are degraded, and additionally, it comes to be difficult to obtain a stable tear linearity of the film. Also, in the case where the content of PTMG exceeds 20% by mass, in particular, when the film is produced on a mass production scale, a phenomenon of the pulsation (the so-called Barus phenomenon) of the film at the time of extrusion may occur, and unfortunately the unevenness of the film thickness may become large.

The modified PBT can be obtained by performing, in the polymerization process of PBT, a polycondensation reaction under the addition of PTMG. For example, the modified PBT can be obtained by the polycondensation between the transesterification product of dimethyl terephthalate and 1,4-butanediol and PTMG having a molecular weight of 600 to 4,000.

In the biaxially stretched polyester film of the present invention, the mass ratio (modified PBT/PET) between the modified PBT and PET is required to be 20/80 to 5/95, and is preferably 15/85 to 10/90. When the mass proportion of the modified PBT is less than 5% by mass, it comes to be difficult to obtain the tear linearity of the film. When the mass proportion of the modified PBT exceeds 20% by mass, there is an adverse possibility such that the variation of the film thickness comes to be large, the tear linearity of the obtained film is degraded, and additionally, the amounts of the generated outgases exceed the values specified in the present invention. In other words, for the purpose of imparting tear linearity to a film and reducing the amounts of the generated outgases, the mixing ratio between the modified PBT and PET is required to be within the above-described range.

The biaxially stretched polyester film of the present invention can include other polymers such as polyethylene naphthalate and polycyclohexylene dimethylene terephthalate within a range not impairing the advantageous effects of the present invention.

In the biaxially stretched polyester film of the present invention, the amount of tetrahydrofuran (THF) generated by heat treating the biaxially stretched polyester film in a helium gas atmosphere at 180° C. for 30 minutes is required to be 50 µg/g or less, and is preferably 30 µg/g or less and more preferably 20 µg/g or less. In the present invention, the reason for particularly specifying the amount of generated THF among the generated components resides in the fact that THF is a volatile (low melting point) component.

When the amount of generated THF exceeds 50 µg/g, the packaged contents may be possibly contaminated by the generated THF. Even when the vapor deposition processing is applied to the biaxially stretched polyester film for the purpose of improving the gas barrier property or water vapor gas barrier property, there is an adverse possibility such that THF is generated from the film during the vapor deposition treatment, the generated THF adversely affects the formation of the vapor deposited layer, and the gas barrier property or water vapor gas barrier property of the film is not stably improved.

For the purpose of regulating the amount of THF generated from the biaxially stretched polyester film of the present invention to be equal to or less than 50 μg/g specified in the present invention, the amount of THF generated from the modified PBT chip used at the time of production of the film is preferably set at 800 μg/g or less, more preferably set at 500 μg/g or less and most preferably set at 300 μg/g or less. When the amount of THF generated from the modified PBT is larger than 800 μg/g, depending on the mixing ratio between the modified PBT and PET, the amount of THF generated from the film may become larger than the value specified in the present invention.

Examples of the method for regulating the amount of THF generated from the modified PBT chip to be 800 μg/g or less include a method in which the polymerized modified PBT chip is dried in a reduced pressure environment, a method in which the polymerized modified PBT chip is dried in a nitrogen atmosphere, and a method in which the polymerized modified PBT chip is dried in a hot air dryer: among these, the drying in a reduced pressure environment is most efficient, and preferable also from the viewpoint of workability/economic efficiency.

When the polymerized modified PBT chip is dried by these methods, the drying temperature is preferably 80 to 180° C. and the drying time is preferably 12 hours or more and more preferably 24 hours or more. When the polymerized modified PBT chip is dried in a reduced pressure environment, in addition to the above-described temperature and time, the pressure reduction degree is preferably 10 Pa or less.

In the production of the biaxially stretched polyester film of the present invention, for example, first, a mixture composed of the modified PBT and PET is placed in an extruder, heated and melted, and then extruded from the die orifice of a T-die in a sheet shape to produce an unstretched sheet. The sheet extruded from the die orifice of the T-die is cooled as closely wound around a cooling drum, for example, by an electrostatic casting method, then at a temperature of 90 to 140° C., stretched longitudinally and transversely with a magnification of 3.0 to 5.0, and further heat treated at a temperature of 210 to 245° C. to yield a biaxially stretched film.

When the stretching temperature is lower than 90° C., a uniform stretched film cannot sometimes be obtained, and when the stretching temperature exceeds 140° C., the crystallization of PET is promoted to sometimes degrade the transparency of the film. When the stretching magnification is less than 3.0, the strength of the obtained stretched film is low, and a bag prepared with such a stretched film tends to undergo the occurrence of pin holes; when the stretching magnification exceeds 5.0, the stretching sometimes becomes difficult. When the heat treatment temperature is lower than 210° C., the thermal shrinkage coefficient of the obtained stretched film becomes large, the bag made of such a film is sometimes deformed; when the heat treatment temperature is higher than 245° C., the fusion of the film sometimes occurs.

As the biaxially stretching method, either of the tenter simultaneous biaxial stretching method and the successive biaxial stretching method using a roll and a tenter may be used. Alternatively, a biaxially stretched film may also be produced by a tubular method.

The biaxially stretched polyester film, obtained as described above, of the present invention can be enhanced in the oxygen gas barrier property or the water vapor barrier property thereof, by applying a vapor deposition treatment to at least one side of the film, with aluminum, silicon oxide or aluminum oxide, or a combination of two or more of these components such as a combination of silicon oxide and aluminum oxide. As the method for producing a vapor deposited layer, for example, a vacuum vapor deposition method, an EB vapor deposition method, a sputtering method and an ion plating method can be used; from the viewpoint of the productivity and the cost, the vacuum vapor deposition method is most preferable.

The vacuum vapor deposition method is a method for forming a deposited layer as follows: after the film is placed in a vacuum state in a chamber, the component to be vapor-deposited is melted and then vaporized to be deposited on the film to form the deposited layer. In this method, when the outgases are present in the film in large amounts, unfortunately the degree of vacuum in the chamber is not stabilized due to the diffusion of the outgases, the formation of the vapor deposited layer becomes unstable, and it is sometimes difficult to obtain the intended oxygen barrier property or the intended water vapor barrier property. In particular, when a vacuum deposition is performed on a roll film, the roll surface is continuously renewed, and hence even if a stable vapor deposited layer can be formed at the start of the vapor deposition, in the case where the outgases remain in the film, the formation of the vapor deposited layer sometimes comes to be unstable as the vapor deposition treatment proceeds. However, the biaxially stretched polyester film of the present invention is small in the residual amounts of the outgases, and hence even on a roll film, a vapor deposited layer can be stably formed.

For the purpose of improving the adhesiveness to the vapor deposited layer such as an aluminum vapor deposited layer, the surface of the biaxially stretched polyester film of the present invention is preferably pretreated by a method such as corona discharge treatment or an application of an anchor coating agent.

The biaxially stretched polyester film of the present invention can be subjected to a surface treatment by utilizing, according to the intended applications thereof, corona discharge treatment, surface hardening treatment, plating treatment, coloring treatment, or various coating treatments.

EXAMPLES

Next, the present invention is specifically described by way of Examples. The evaluation methods of Examples and Comparative Examples are as follows.

(1) Evaluation of Tear Linearity

From a biaxially stretched polyester film, strip-shaped pieces of the film each piece being 205 mm in the lengthwise direction (MD) and 20 mm in the widthwise direction (TD) were sampled; in each of the pieces of the film, a cut (notch) of 5 mm in length was made into the center of one TD side to prepare a sample; thus ten samples were prepared in total; then, each sample was torn by hand from the notch in the MD direction; then, the number of the samples in each of which the tear propagation edges reached the TD side opposite to the TD side with the notch was evaluated.

The evaluation standards are shown below.

Evaluation E(Excellent): The number of the samples with the tear reaching the opposite TD side is 9 to 10.

Evaluation G(Good): The number of the samples with the tear reaching the opposite TD side is 7 to 8.

Evaluation A(Average): The number of the samples with the tear reaching the opposite TD side is 5 to 6.

Evaluation P(Poor): The number of the samples with the tear reaching the opposite TD side is 4 or less.

In the present invention, the evaluation grades equal to or higher than G(Good) were determined as passing.

(2) Identification of Outgas Components and Measurement of Amounts of Generated Outgas Components For the identification of the outgas components, about 15 mg of the biaxially stretched polyester film or about 15 mg of the modified PBT chip was accurately weighed and packed in a sample cup, heated in a pyrolyzer (PY-2020iD), in a helium gas atmosphere at 180° C. for 30 minutes, and the generated volatile components were subjected to a GC/MS (GC: Agilent 6890N, MS: Agilent 5975C) measurement. In this case, the generated outgases were tetrahydrofuran (THF), 1,4-butanediol (BD) and water, and ethylene glycol (EG) was also generated from the biaxially stretched polyester film.

The amounts of the respective generated outgases were measured by using the following standard sample and internal standard. Specifically, as the standard sample, a solution was prepared in which hexadecane, THF, BD and EG were dissolved in hexane each in a content of 100 ppm, the resulting solution was subjected to the GC/MS measurement under the same conditions as for the sample, and the peak area ratios of the individual components to the peak area of hexadecane were derived. Next, as the internal standard, a hexane solution having a hexadecane concentration of 100 ppm was prepared, 5 μl of the prepared internal standard was added to a sample prepared by accurately weighing about 15 mg of the biaxially stretched polyester film or the modified PBT chip, and the resulting sample solution was subjected to the GC/MS measurement to quantitatively determine the amounts of the individual generated outgas components.

(3) Evaluation of Performances of Vapor-Deposited Film

A polyester resin (Eritel UE-3200, manufactured by Unitika Ltd., Tg: 65° C.) and an isocyanate-based curing agent (CAT-10, manufactured by Toyo-Morton, Ltd.) were mixed with each other in a mixing ratio of 10/1 (mass ratio) to prepare a coating material. The obtained coating material was applied as an anchor coating agent to the biaxially stretched polyester film having a winding length 8000 m so as for the thickness to be 0.1 μm, and then by using a continuous vacuum deposition apparatus, an aluminum oxide layer was vapor deposited so as for the vapor deposition thickness to be 40 to 50 nm. Sampling was performed in the portions of 100 m, 2000 m, 4000 m and 7500 m from the surface layer of the vapor-deposited film (the winding core side of the placed biaxially stretched polyester film), and the measurements of the oxygen permeability and the water vapor permeability were performed.

(3-a) Oxygen Permeability (ml/m$^2$·day·MPa)

According to JIS K-7129, by using the Model OX-TRAN100 manufactured by Modern Control Co., Ltd., a measurement was performed under the conditions of a temperature of 20° C. and a humidity of 100% RH.

The evaluation standards are shown below.

Evaluation E(Excellent): The oxygen permeability is less than 20 ml/(m$^2$·day·MPa).

Evaluation G(Good): The oxygen permeability is 20 or more and less than 30 ml/(m$^2$·day·MPa).

Evaluation A(Average): The oxygen permeability is 30 or more and less than 50 ml/(m$^2$·day·MPa).

Evaluation P(Poor): The oxygen permeability is 50 ml/(m$^2$·day·MPa) or more.

In the present invention, the evaluation grades equal to or higher than G(Good) were determined as passing.

(3-b) Water Vapor Permeability (g/m$^2$·day)

According to JIS K-7129, by using the PARMATRAN W3/31 manufactured by Modern Control Co., Ltd., a measurement was performed under the conditions of a temperature of 40° C. and a humidity of 90% RH.

The evaluation standards are shown below.

Evaluation E(Excellent): The water vapor permeability is less than 2 g/(m$^2$·day).

Evaluation G(Good): The water vapor permeability is 2 or more and less than 5 g/(m$^2$·day).

Evaluation A(Average): The water vapor permeability is 5 or more and less than 10 g/(m$^2$·day).

Evaluation P(Poor): The water vapor permeability is 10 g/(m$^2$·day) or more.

In the present invention, the evaluation grades equal to or higher than G(Good) were determined as passing.

Example 1

Production of Modified PBT

A transesterification reaction was performed for 2.5 hours while 194 parts by mass of dimethyl terephthalate, 108 parts by mass of 1,4-butanediol and 80 ppm (a numerical value in terms of the mass of titanium metal in relation to the polymer) of tetrabutyl titanate were heated to increase the temperature from 150° C. to 210° C. To a polymerization can, 85 parts by mass of the obtained transesterification reaction product was transferred, 40 ppm of tetrabutyl titanate was added to the can, then 15 parts by mass of PTMG having a molecular weight of 1,100 was added to the can; then, a pressure reduction was started, and finally, under a reduced pressure of 1 hPa, the temperature was increased from 210° C.; finally, at a temperature of 245° C., a melt polymerization was performed for 2 hours, to produce the modified PBT having a relative viscosity of 1.62.

The amounts of the outgases generated from the produced modified PBT were THF: 3000 μg/g and 1,4-butanediol (BD): 10 μg/g.

The modified PBT produced by the above-described method was dried in a reduced pressure dryer, for 72 hours under the conditions of 120° C. and 5 Pa. The amounts of the outgases generated from the dried modified PBT were THF: 280 μg/g and BD: 5 μg/g.

<Production of Biaxially Stretched Polyester Film>

A mixture prepared by simple chip-mixing of the modified PBT with PET(relative viscosity: 1.38) in a mass ratio of 15/85 was melt extruded at a resin temperature of 280° C. by using a 200-mmφ extruder provided with a coat hanger type T-die, and rapidly cooled, in a closely adhering manner, on a cast roll regulated at a temperature of 20° C. by applying an electric voltage of 7 kV to a pinning wire, to yield an unstretched sheet having a thickness of about 190 μm.

The obtained unstretched sheet was stretched by using a roll longitudinal stretching machine at 90° C. with a magnification of 3.5, and by using a tenter transverse stretching machine at 120° C. with a magnification of 4.5, then heat treated at 235° C. with a transverse relaxation rate set at 3%, and slowly cooled to room temperature to yield a biaxially stretched polyester film having a thickness of 12 µm.

The amounts of the outgases generated from the produced biaxially stretched polyester film were THF: 8 µg/g, BD: 1 µg/g and ethylene glycol (EG): 70 µg/g.

Examples 2 to 3 and Comparative Example 1

In each of Examples 2 to 3 and Comparative Example 1, a biaxially stretched polyester film was obtained in the same manner as in Example 1 except that the drying time of the modified PBT chip was altered as shown in Table 1.

Example 4

The modified PBT chip was placed in a 5 m³ dryer, and dried in an atmosphere set at 120° C., for 24 hours while nitrogen was allowed to flow in the dryer at a flow rate of 5 m³/s. The amounts of the outgases generated from the modified PBT after drying were THF: 480 µg/g and BD: 8 µg/g. By using this modified PBT chip, a biaxially stretched polyester film was obtained in the same manner as in Example 1.

Example 5 and Comparative Example 2

In each of Example 5 and Comparative Example 2, a biaxially stretched polyester film was obtained in the same manner as in Example 4 except that the drying time of the modified PBT chip was altered as shown in Table 1.

Example 6

The modified PBT chip was dried in a hot air dryer set at 120° C. for 72 hours. The amounts of the outgases generated from the modified PBT after drying were THF: 1200 µg/g and BD: 9 µg/g. By using this modified PBT chip, a biaxially stretched polyester film was obtained in the same manner as in Example 1.

Comparative Example 3

A biaxially stretched polyester film was obtained in the same manner as in Example 6 except that the drying time of the modified PBT chip was altered as shown in Table 1.

Examples 7 to 9 and Comparative Examples 4 and 5

In each of Examples 7 to 9 and Comparative Examples 4 and 5, a biaxially stretched polyester film was obtained in the same manner as in Example 1 except that the proportion of PTMG in the modified PBT chip was altered as shown in Table 1.

Examples 10 to 12 and Comparative Examples 6 and 7

In each of Examples 10 to 12 and Comparative Examples 6 and 7, a biaxially stretched polyester film was obtained in the same manner as in Example 1 except that the mixing ratio between the modified PBT and PET was altered as shown in Table 1.

Examples 13 to 15 and Comparative Examples 8 and 9

In each of Examples 13 to 15 and Comparative Examples 8 and 9, a biaxially stretched polyester film was obtained in the same manner as in Example 1 except that the molecular weight of PTMG used in the modified PBT was altered as shown in Table 1.

Example 16

A biaxially stretched polyester film was obtained in the same manner as in Example 6 except that the mixing ratio between the modified PBT and PET was altered as shown in Table 1.

Comparative Example 10

A biaxially stretched polyester film was obtained in the same manner as in Comparative Example 1 except that the mixing ratio between the modified PBT and PET was altered as shown in Table 1.

Table 1 shows, for the biaxially stretched polyester film obtained in each of Examples and Comparative Examples, for example, the tear linearity, the amount of THF in the generated outgases, and the evaluation results of the oxygen permeability and the water vapor permeability after the application of the vapor deposition treatment to the film.

TABLE 1

| | | Modified PBT | | | | | | | Biaxially stretched polyester film | | | |
| --- | --- | --- | --- | --- | --- | --- | --- | --- | --- | --- | --- | --- |
| | | Constitution | | | | | Amounts of | | Mixing ratio | Amounts of | | |
| | | Content of PTMG (% by mass) | Molecular weight of PTMG | Drying conditions | | | generated outgases (µg/g) | | (mass ratio) | generated outgases (µg/g) | | |
| | | | | Method | Temperature (° C.) | Time (hr) | THF | BD | Modified PBT/PET | THF | BD | EG |
| Examples | 1 | 15 | 1100 | Reduced pressure | 120 | 72 | 280 | 5 | 15/85 | 8 | 1 | 70 |
| | 2 | 15 | 1100 | Reduced pressure | 120 | 48 | 600 | 8 | 15/85 | 18 | 1 | 68 |
| | 3 | 15 | 1100 | Reduced pressure | 120 | 24 | 810 | 10 | 15/85 | 24 | 2 | 78 |
| | 4 | 15 | 1100 | Nitrogen | 120 | 24 | 480 | 8 | 15/85 | 14 | 3 | 74 |
| | 5 | 15 | 1100 | Nitrogen | 120 | 12 | 750 | 10 | 15/85 | 23 | 3 | 65 |
| | 6 | 15 | 1100 | Hot air | 120 | 72 | 1200 | 9 | 15/85 | 36 | 2 | 72 |
| | 7 | 5 | 1100 | Reduced pressure | 120 | 72 | 260 | 5 | 15/85 | 8 | 1 or less | 75 |
| | 8 | 10 | 1100 | Reduced pressure | 120 | 72 | 263 | 5 | 15/85 | 8 | 1 or less | 62 |

TABLE 1-continued

|  | # | | | | | | | | | | | |
|---|---|---|---|---|---|---|---|---|---|---|---|---|
|  | 9 | 20 | 1100 | Reduced pressure | 120 | 72 | 302 | 5 | 15/85 | 9 | 1 or less | 75 |
|  | 10 | 15 | 1100 | Reduced pressure | 120 | 72 | 280 | 5 | 5/95 | 3 | 1 or less | 88 |
|  | 11 | 15 | 1100 | Reduced pressure | 120 | 72 | 280 | 5 | 10/90 | 6 | 1 or less | 78 |
|  | 12 | 15 | 1100 | Reduced pressure | 120 | 72 | 280 | 5 | 20/80 | 11 | 2 | 70 |
|  | 13 | 15 | 600 | Reduced pressure | 120 | 72 | 220 | 6 | 15/85 | 7 | 2 | 72 |
|  | 14 | 15 | 4000 | Reduced pressure | 120 | 72 | 350 | 5 | 15/85 | 11 | 1 | 63 |
|  | 15 | 15 | 2000 | Reduced pressure | 120 | 72 | 320 | 5 | 15/85 | 10 | 1 | 71 |
|  | 16 | 15 | 1100 | Hot air | 120 | 72 | 1200 | 9 | 20/80 | 48 | 4 | 61 |
| Comparative Examples | 1 | 15 | 1100 | Reduced pressure | 120 | 8 | 1848 | 5 | 15/85 | 55 | 1 | 63 |
|  | 2 | 15 | 1100 | Nitrogen | 120 | 6 | 1743 | 5 | 15/85 | 52 | 1 | 60 |
|  | 3 | 15 | 1100 | Hot air | 120 | 48 | 2236 | 4 | 15/85 | 67 | 2 | 68 |
|  | 4 | 25 | 1100 | Reduced pressure | 120 | 72 | 235 | 4 | 15/85 | Impossible to form film | | |
|  | 5 | 3 | 1100 | Reduced pressure | 120 | 72 | 224 | 4 | 15/85 | 9 | 1 | 77 |
|  | 6 | 15 | 1100 | Reduced pressure | 120 | 72 | 235 | 4 | 3/97 | 2 | 1 or less | 85 |
|  | 7 | 15 | 1100 | Reduced pressure | 120 | 72 | 208 | 4 | 25/75 | 14 | 3 | 60 |
|  | 8 | 15 | 500 | Reduced pressure | 120 | 72 | 280 | 4 | 15/85 | 11 | 2 | 71 |
|  | 9 | 15 | 4500 | Reduced pressure | 120 | 72 | 195 | 4 | 15/85 | 8 | 2 | 75 |
|  | 10 | 15 | 1100 | Reduced pressure | 120 | 8 | 1848 | 5 | 25/75 | 120 | 10 | 65 |

| | | | Biaxially stretched polyester film | | | | | | | |
|---|---|---|---|---|---|---|---|---|---|---|
| | | | Tear linearity | Oxygen permeability after vapor deposition treatment | | | | Water vapor permeability after vapor deposition treatment | | | |
| | | | | 100 m | 2000 m | 4000 m | 7500 m | 100 m | 2000 m | 4000 m | 7500 m |
| Examples | 1 | E | E | E | E | E | E | E | E | E |
| | 2 | E | G | E | E | E | G | E | E | E |
| | 3 | E | G | G | G | E | G | G | G | G |
| | 4 | E | G | E | E | E | G | E | E | E |
| | 5 | E | G | G | E | E | G | E | E | E |
| | 6 | E | G | G | G | G | G | G | G | G |
| | 7 | G | E | E | E | E | E | E | E | E |
| | 8 | G | E | E | E | E | E | E | E | E |
| | 9 | G | E | E | E | E | E | E | E | E |
| | 10 | E | E | E | E | E | E | E | E | E |
| | 11 | E | E | E | E | E | E | E | E | E |
| | 12 | E | G | G | E | E | G | G | E | E |
| | 13 | G | G | E | E | E | G | E | E | E |
| | 14 | G | G | G | E | E | G | G | E | E |
| | 15 | G | G | E | E | E | G | E | E | E |
| | 16 | E | G | G | G | G | G | G | G | G |
| Comparative Examples | 1 | E | A | A | G | G | P | P | A | G |
| | 2 | E | A | A | G | G | P | A | G | G |
| | 3 | E | P | A | G | G | P | P | A | G |
| | 4 | | | | Impossible to form film | | | | | |
| | 5 | P | E | E | E | E | E | E | E | E |
| | 6 | P | E | E | E | E | E | E | E | E |
| | 7 | A | G | G | E | E | G | G | E | E |
| | 8 | P | G | E | E | E | G | E | E | E |
| | 9 | P | G | E | E | E | G | E | E | E |
| | 10 | A | P | P | A | G | P | A | A | G |

As can be seen from Table 1, in each of Examples, the amount and the molecular weight of PTMG contained in the modified PBT, the mixing ratio between the modified PBT and PET, and the amount of THF generated from the biaxially stretched polyester film satisfied the ranges specified in the present invention, and consequently, it was possible to prepare the film having excellent tear linearity, being small in the amounts of the generated outgases, and being stable in the gas barrier property after the vapor deposition treatment.

In contrast, in Comparative Examples, the following unfavorable results were found.

In each of Comparative Examples 1 to 3, the amount and the molecular weight of PTMG contained in the modified PBT, and the mixing ratio between the modified PBT and PET satisfied the ranges specified in the present invention, and hence the film having tear linearity was obtained; however, the amount of generated THF exceeded the range specified in the present invention, and hence the oxygen permeability and the water vapor permeability of the vapor-deposited film were unstable.

In Comparative Example 4, the proportion of PTMG contained in the modified PBT was larger than the range specified in the present invention, and hence the film formation was difficult, and consequently it was not possible to obtain a biaxially stretched polyester film. In Comparative Example 5, the amount of generated THF specified in the present invention was satisfied, and hence the oxygen permeability and the water vapor permeability of the vapor-deposited film were stable; however, the proportion of PTMG contained in the modified PBT was smaller than the range specified in the present invention, and hence it was impossible to obtain a film having a satisfactory tear linearity.

In each of Comparative Examples 6 and 7, the amount of generated THF specified in the present invention was satisfied, and hence the oxygen permeability and the water vapor permeability of the vapor-deposited film were stable; however, the ratio between the modified PBT and PET fell outside the range specified in the present invention, and hence it was impossible to obtain a film having a satisfactory tear linearity.

In each of Comparative Examples 8 and 9, the amount of generated THF specified in the present invention was satisfied, and hence the oxygen permeability and the water vapor permeability of the vapor-deposited film were stable; however, the molecular weight of PTMG contained in the modified PBT chip fell outside the range specified in the present invention, and hence it was impossible to obtain a film having a satisfactory tear linearity.

In Comparative Example 10, the amount of THF generated from the biaxially stretched polyester film exceeded the range specified in the present invention, and hence the oxygen permeability and the water vapor permeability of the vapor-deposited film were unstable. Additionally, the ratio between the modified PBT and PET fell outside the range specified in the present invention, and hence it was impossible to obtain a film having a satisfactory tear linearity.

The invention claimed is:

1. A biaxially stretched polyester film, being a biaxially stretched film comprising a modified polybutylene terephthalate (modified PBT) and polyethylene terephthalate (PET), wherein a mass ratio (modified PBT/PET) between the modified PBT and PET is 20/80 to 5/95, the modified PBT is a PBT containing 5 to 20% by mass of a polytetramethylene glycol unit having a molecular weight of 600 to 4,000, an amount of tetrahydrofuran (THF) generated by heat treating the biaxially stretched film in a helium gas atmosphere at 180° C. for 30 minutes is 50 µg/g or less, and the biaxially stretched film has tear linearity in a lengthwise direction thereof.

2. A biaxially stretched polyester film, wherein at least on one side of the biaxially stretched polyester film according to claim 1, at least one of aluminum, aluminum oxide and silicon oxide is vapor deposited, and the biaxially stretched polyester film has a gas barrier property and tear linearity.

3. A method for producing the biaxially stretched polyester film according to claim 1, wherein a modified polybutylene terephthalate (modified PBT) including 5 to 20% by mass of a polytetramethylene glycol unit having a molecular weight of 600 to 4,000 and giving an amount of tetrahydrofuran (THF), generated by heat treating in a helium gas atmosphere at 180° C. for 30 minutes, of 800 µg/g or less and polyethylene terephthalate (PET) are mixed so as for a mass ratio (modified PBT/PET) between the modified PBT and PET to be 20/80 to 5/95, a film is formed from a resulting mixture and a formed film is stretched.

* * * * *